United States Patent [19]
Molnar et al.

[11] Patent Number: 6,072,805
[45] Date of Patent: Jun. 6, 2000

[54] OBSERVING ARBITER

[75] Inventors: Charles E. Molnar, deceased, late of Sunnyvale, by Donna A. Molnar, executor; Ian W. Jones, Palo Alto; Ivan E. Sutherland, Santa Monica, all of Calif.

[73] Assignee: Sun Microsystems, Inc., Palo Alto, Calif.

[21] Appl. No.: 08/884,927

[22] Filed: Jun. 30, 1997

[51] Int. Cl.[7] .................................................. H04J 3/02
[52] U.S. Cl. ........................................ 370/462; 370/461
[58] Field of Search .................................. 370/386, 390, 370/412, 414, 432, 462; 395/725, 292

[56] References Cited

U.S. PATENT DOCUMENTS

| 5,418,967 | 5/1995 | Simcoe et al. | 395/725 |
|---|---|---|---|
| 5,805,838 | 9/1998 | Sutherland et al. | 395/292 |
| 5,835,491 | 11/1998 | Davis et al. | 370/386 |

*Primary Examiner*—Huy D. Vu
*Assistant Examiner*—Alexander Boakye
*Attorney, Agent, or Firm*—Townsend and Townsend and Crew LLP

[57] ABSTRACT

An arbiter is disclosed for determining a sequence of signals indicative of events occurring variously on at least two input connections. The arbiter includes a first input connection and a second input connection for carrying the signals indicative of events. A first input queue for storing representations of events that are waiting to be processed is connected to the first input connection, and a second input queue also for storing representations of events that are waiting to be processed is connected to the second input connection. An arbitration circuit coupled to the first input queue and to the second input queue receives the representations of events from each of the queues and determines the temporal order of occurrence of the event representations in the queues when the events arrive at time intervals greater than a specified amount, and arbitrarily assigns a sequence to one or the other of the events from the queues when the events arrive at time intervals equal to or less than the specified amount. In response the arbitration circuit reports the temporal order or arbitrary sequence as a sequence of output signals and removes each event representation from the appropriate queue when reporting its temporal order or sequence.

17 Claims, 5 Drawing Sheets

OBSERVING ARBITER

BACKGROUND OF THE INVENTION

Embodiments of this invention relate to the subject of arbitration in electronic circuits, and particularly to arbitration in asynchronous systems. Because events in asynchronous systems may occur at any time, it is often necessary to choose an action that depends on which of two, or more, often nearly simultaneous events is to be treated first. Devices that make such choices are commonly called arbiters.

Figure 1A:
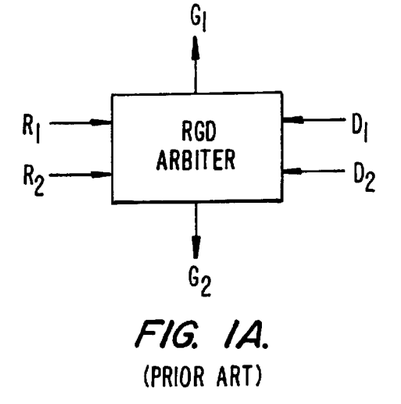
FIG. 1a is a block diagram of a prior art RGD arbiter.

Two principal forms of arbiter are known. The first is the Request, Grant, Done (RGD) arbiter. A block diagram of a typical prior art RGD arbiter is shown in FIG. 1a. As its name implies, the communication channel between the RGD arbiter and each of its users permits three event signals called Request, Grant and Done on each of its terminals or channels. Herein we refer to its six event signals, three for the first channel of communication as R1, G1, D1, and three for the second channel of communications as R2, G2, D2. The numerical designation identifies the communication channel, and thus the user. The operation of an RGD arbiter is described below.

Figure 1B:
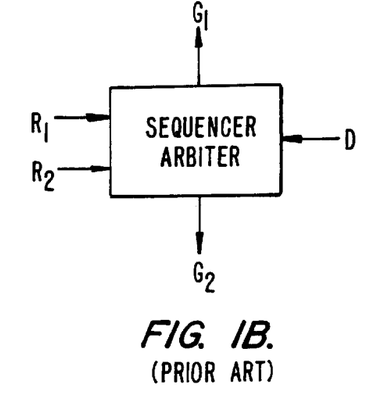
FIG. 1b is a block diagram of a prior art Sequencer arbiter.

A second form of prior art arbiter is the Sequencer arbiter, or "five wire" arbiter, so called because it uses a common done signal for both user channels. A typical Sequencer arbiter is shown in FIG. 1b. Herein we refer to the five event signals of a sequencer as R1, G1, R2, G2 and D. For both types of arbiters—RGD arbiters and Sequence arbiters—the request, R1 and R2, and done, D or D1 and D2, event signals are input signals, while the grant, G1 and G2, signals are output signals. Many different encodings of event signals in the input and output channels of arbiters are possible. For example, each transition, rising or falling, of an electrical voltage on a wire is one possible encoding. Any change in a voltage, current, light level or similar phenomena may be used as well. Electrical or other forms of pulses may also be used to encode events.

The arbiter action in both the above prior art arbiters controls when the arbiter will generate grant signals. The intent of arbitration implies that the arbiter will produce only one grant signal "at a time." In asynchronous systems, however, the notion of "at a time" must be made more explicit. For the RGD arbiter the conventional rule is that after producing a grant signal G1 in response to a request R1, the arbiter will produce no further output signals, G1 or G2, until it receives the done signal D1. The done signal indicates that whatever action was to occur on that first channel is complete. Thus for the RGD arbiter, after a first request R1 on channel 1, and after that channel is given a grant G1, a following request on channel 1 or a request on channel 2 must wait for the done signal D1 before it will be given a grant signal, G1 or G2, respectively. The subsequent grant signal is delayed until channel 1 has finished its action in response to the first grant signal on channel 1 and so indicated via signal D1. For the Sequencer arbiter the rule is similar. In the Sequencer arbiter, however, both channels indicate completion with the same shared done signal D. Because only one channel can have an outstanding grant, there is no ambiguity upon receipt of a signal D regarding which channel completion is indicated. The Sequencer arbiter and the RGD arbiter are closely related. It is known that one can build a Sequencer arbiter using an RGD arbiter (and other components well known in the art) and vice versa.

Figure 1C:
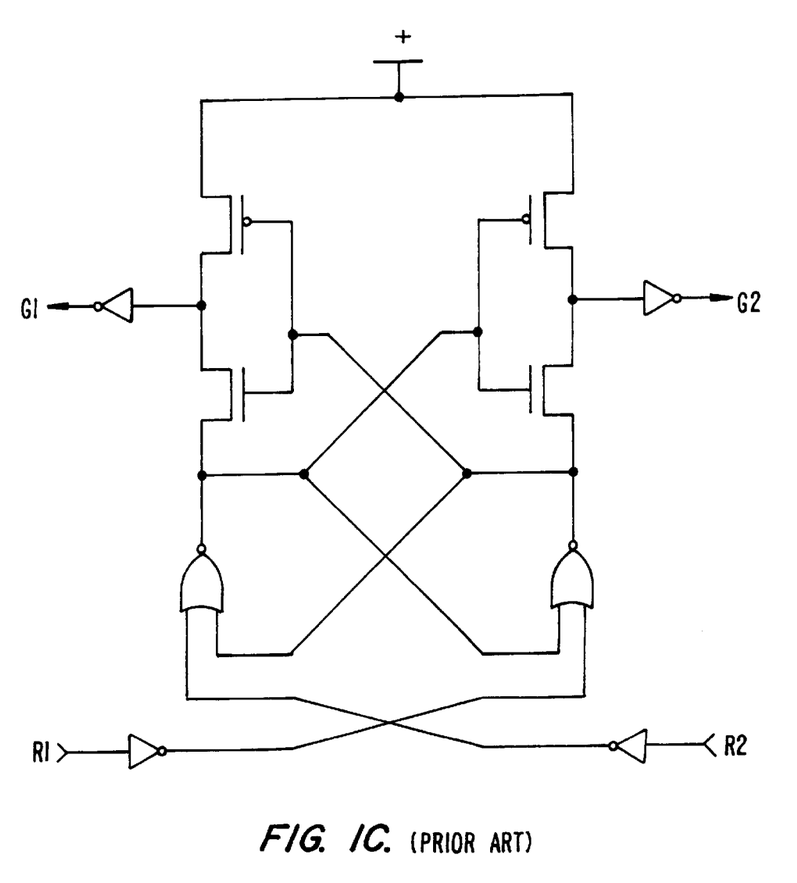
FIG. 1c is a schematic diagram of a prior art mutual exclusion element.

Basic to most forms of arbiter is a mutual exclusion (ME) element. FIG. 1c illustrates a typical prior art mutual exclusion element. The mutual exclusion element is a circuit that executes the RGD arbiter function using a particular communication protocol. A mutual exclusion element has two input paths and two output paths, one input and one output path associated with each channel. For the first channel, a rising signal on its input path signifies request, R1, and a falling signal on that same path signifies done, D1. The ME element signals a corresponding grant with a rising signal on its G1 output channel. A falling signal on the G1 output channel has no significance. Thus, the mutual exclusion element is effectively an RGD arbiter with a particular encoding of communication signals. Mutual exclusion elements commonly form the basis for RGD arbiters and Sequencer arbiters that use other communication protocols. The mutual exclusion element is not only a basis for RGD arbiters and Sequencers, but is also useful as a basic element in synchronizers. A synchronizer captures the value of an external signal for use in a synchronous system, ensuring that the captured form of the external signal remains stable during the interval in each clock cycle during which stability is required. The art of designing synchronizers and mutual exclusion elements is well known.

Arbiters are used to make choices that depend upon the order in which requests reach the arbiter. For example, arbiters can be used to implement a "first-come, first-served" policy for sharing access to a common resource. In a typical implementation, a requester will not be given a second grant until service of its first grant is complete, as indicated by the receipt of its done signal. Implementations of an arbiter also can be optimized for the environment in which it is used.

In one such environment, requests to the arbiter occur relatively infrequently compared to the duration of the execution of its service. In such an environment the done signal corresponding to a first request will more often be received back by the arbiter before a second request is made. A "late Request" implementation of the arbiter is suitable in such situations, and the receipt of the done signal enables a next arbitration to be carried out.

In another environment, input requests more frequently arrive before the done signal has been received back. A "late Done" arbiter implementation is suitable in such an environment. It permits a new arbitration to be carried out as soon as the first grant signal has been issued, but the outcome of the arbitration is not permitted to produce a new grant output until the done signal corresponding to the first grant has been received back.

Both of these arbiter implementations will work correctly even in the environment for which they are not optimized; in their "own" environments, however, they offer significant speed advantages.

Both the RGD and Sequencer arbiters require users to wait for a grant signal before proceeding. Thus the RGD arbiter and Sequencer arbiter work like a traffic policeman at an intersection, indicating which of the crossing roads is next to be used. Until given the grant signal, traffic must wait. As will be described below, the present invention removes this restriction, allowing the traffic to proceed at its own pace as if at an overpass, noting the sequence of passing traffic without delaying it. This provides significant advantages for the design of circuits and systems using the invention.

SUMMARY OF THE INVENTION

Embodiments of the present invention provide a technique and a system for choosing a proper course of action for computing equipment where multiple courses of action are possible and each is correct. As will be described, the choice will be based on an analog timing model of the delay involved in each such action. Because the chosen action need not affect the timing model, the arbiter observes the timing model without affecting it. Herein we sometimes refer to such an arbiter as an "Observing" arbiter or an "Observiter."

In a more abstract view, an arbiter's job is to assign a sequential order to the events that it observes. The consequences of this order are separable from the ordering decisions themselves, as well as from other actions triggered by the events that are presented to the arbiter. From this perspective, the arbiter is an observer of two streams of events that records, for each event, its position in an ordered sequence.

Generally, a request that arrives at an "earlier" time is ordered ahead of a request that arrives at a "later" time. This intuitive picture is consistent with a concept of global time, which gives the two input requests an absolute temporal order that the arbiter attempts to recognize and announce, although not always with perfect fidelity. Of course, imperfect arbiters occasionally grant first place to a request that actually arrived a little bit later than a competing request, with the competing request granted second place. Within this statement, however, is the assumption that events have a "true" order, and that this order must be preserved at the outputs of the arbiter. As discussed below, however, this is not necessarily the case.

The Observing arbiter deals with repetitive events about which it is expected to make a series of decisions with respect to their sequence. In some cases the measured events will be sufficiently separated in time that the decision will be easy to make. In other cases the events will be close together in time, forcing the observing arbiter to make a "close call." In one sense it makes no difference how the observing arbiter makes a "close call" so long as the call is clean. There is no "right" answer to a close call; the call of the "umpire" rules, regardless of what other observers may think or say. The Observing arbiter's task is to make clean decisions, even in situations that are inherently ambiguous. Unlike the prior art RGD arbiters and Sequencer arbiters, the Observing arbiter permits the system to proceed while the arbiter makes its decision. This improves overall system performance.

No physically-realizable arbiter mechanisms can perform their arbitration tasks with perfect reliability and accuracy. Apart from uncontrollable noise and sensitivities in the arbiter circuit, there will also be differences in the delays along the input signal pathways. Thus two arbiters observing the same pair of request signals might report a different order of arrival of these signals.

This leads to an observation that in an alternative view there is no order to requests received until the arbiter assigns order to them by issuing grants in some sequential order. From this point of view, an arbiter watches a passing flow of events on path A and path B, and delivers its judgments as a sequence of signals, e.g., "grant A, grant A, grant B, grant A, grant B . . . " It is these signals from the arbiter that define an ordering of the passing events.

The Done input terminal to the arbiter permitting the next grant prevents the arbiter from announcing orderings faster than the recipient of this information can capture it. At this level of abstraction, we do not attempt to relate the ordering declaration of the arbiter to the "time" of passing of A and B events. Thus, one cannot speak of a "correct" or "accurate" ordering by the arbiter. The only criterion is that no grant must be given in the absence of a corresponding request.

By relaxing the ordering task, it is possible to carry out other processing operations concurrently with the arbitration task. By queuing input requests, further decoupling of the arbitration from the requesters can provide greater concurrent processing and thus achieve greater system performance. The introduction of queues means that the Observiter can accept multiple requests before it issues any grant. This is distinctly different from the strict Request-Grant-Request-Grant sequence enforced upon each requestee by prior art arbiters.

In one embodiment a system is provided for determining a sequence of signals indicative of events occurring variously on at least two input connections. The system includes at least a first input connection and a second input connection for carrying the signals indicative of events; a first input queue coupled to the first input connection, the first input queue for storing representations of events that are waiting to be processed and, in response to the receipt thereof, providing acknowledgement signals; and a second input queue coupled to the second input connection, the second input queue for storing representations of events that are waiting to be processed and, in response to the receipt thereof, providing acknowledgement signals. An arbitration circuit is coupled to the first input queue and to the second input queue to receive representations of events from each of the queues. In response, the arbitration circuit assigns a sequence to the occurrences of the event representations in the queues. When such events arrive at time intervals greater than a specified amount, the arbitration circuit assigns the sequence based on the temporal order of occurrence. When such signals arrive at time intervals less than or equal to the specified amount, the arbiter assigns an arbitrary sequence to the events from the queues. The change from assigning sequence based on temporal order to assigning an arbitrary sequence to the events is a property of the behavior of the arbiter circuits—there are no additional circuits used to perform this change in behavior.

For simplicity, only two input or channel Observing arbiters are described herein. It should be understood, however, that the techniques described are equally applicable to systems having multiple arbiters or multiple input signals to a single arbiter without loss of generality.

DESCRIPTION OF THE SPECIFIC EMBODIMENTS

Figure 2:
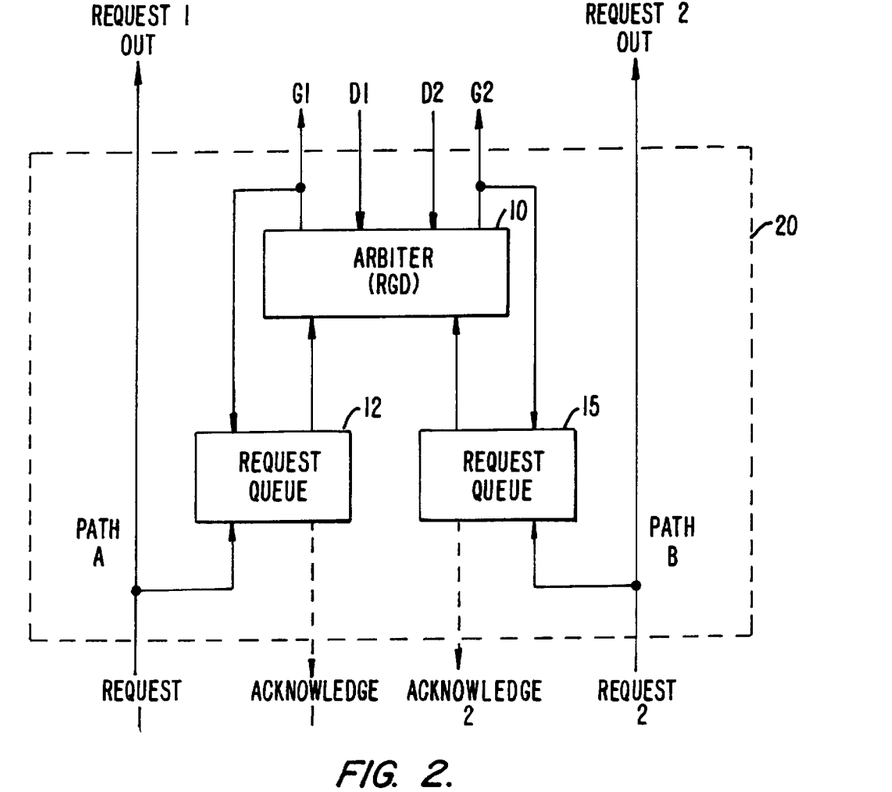
FIG. 2 is a block diagram of one embodiment of an Observing arbiter or Observiter using an RGD arbiter element.

One embodiment of an Observiter is shown in FIG. 2. In the Observiter, input requests are buffered to the arbitration element 10 through independent buffers or queues 12, 15 on each of its request input terminals, as shown in FIG. 2. An RGD arbiter 10 is used as the arbitration element in FIG. 2, though a Sequencer arbiter could equally well be used. As shown in FIG. 2, the requests arrive from paths A and B through request queues 12, 15 coupled between each path and the RGD arbiter element 10. In one embodiment we use any one of several event-driven RGD arbiters, for example, as described in U.S. patent application Ser. No. 08/655,999, filed May 31, 1996, and entitled "Fast Arbiter with Decision Storage." Each request queue presents requests Request 1 and Request 2 to its corresponding arbiter element request terminal R1 and R2, respectively; the corresponding grant signal acknowledges the request. Shown in dashed lines are acknowledge signals from the queues. These signals can be used if it is desired that the queues acknowledge receipt of requests. The benefit of providing the acknowledge signals is discussed below.

The Observing arbiter 20 of FIG. 2 is a device that assigns an order to input events while permitting the flow of events in each of its two input channels (path A, path B) to proceed independently during the assignment. Like prior art devices, the Observing arbiter 20 has Request and Done input terminals and Grant output terminals. Unlike prior art devices, however, it permits more than one request on each of its input terminals prior to producing an output grant signal at its output terminals. It announces its ordering decisions by producing a sequence of grant signals on output terminals G1 and G2. The number of grant signals that it produces for each path (or user) corresponds ultimately to the number of requests made by that user. If the input requests are widely separated in time, the sequence of grants will also correspond exactly to the sequence of input requests. If the input requests are closely separated in time, the Observing arbiter will produce a plausible sequence of output grants that corresponds to the input sequence only within the accuracy of the circuitry involved.

One issue is whether such a passive "observing" arbiter can possibly operate reliably with no effect on the flow of events on the two pathways, in particular, without losing an "event" as a consequence of excessive delay in the arbiter element. The general answer is "no." As in all other arbiters, if events on the two paths flow independently, then an event A and event B will occasionally occur at nearly the same time. In such a case, known physical arbiter element mechanisms may take an unbounded time to make and announce an ordering decision. For a simple arbiter, a grant announcing a decision indicates that a next request can safely be given to the arbiter. When A and B events occur independently, no guaranteed minimum time separation between consecutive events on the same path, A or B, will avoid reliably the presentation of a second request from a path before a previous request is granted. The likelihood of such an unfortunate circumstance, however, where an event is lost is greatly reduced in the Observer by the storage in the queues whose latency extends the time over which a "close call" discussion can be made.

In one embodiment, the request queue mechanism 12, 15 consists of a pair of FIFO control devices. Most thinking about arbiters focuses on the need for them to measure which of several events occurs first in time. Preceding such a device with request queues may introduce errors in timing which might cause the arbiter to pick a later-arriving event as "first." Such potential timing errors make such a device seem to be lacking in utility; but additional important consequence is the overall reduction in delay because the request is permitted to proceed on to further destinations. In previous uses of arbiters, the requesting users waited for the arbitration decision. Assigning a sequence to events while concurrently permitting the requests to proceed obtains added efficiency. Some inaccuracy can be accepted, e.g., in differences in the latency of the two request queues, to reduce the overall delay to the requesting users.

As described, the mechanism for accomplishing this action includes interposing two event queues 12, 15 between the input actions of path A and path B and the RGD arbiter element 10. Input actions deposit events in these queues 12, 15 and go on. The events thus deposited in the queues progress through them to the RGD arbiter element which assigns a sequence to the events. That the sequence thus assigned may be arbitrary when conflicting events arrive nearly concurrently is generally of no consequence to the equipment that follows.

The acknowledge signals of the input event queues, shown in FIG. 2 as Acknowledge 1 and Acknowledge 2, are optional. They signal to a user that the queue is ready to accept another input. By using them, one is assured that input queue congestion will delay further actions at the request input so that no input events will be missed. These input acknowledge signals may be eliminated if one is sure that there will be no congestion in the input queues, i.e., the queues are long enough. It must be appreciated that if the grant signals are dealt with in a timely fashion, congestion in the request queues is exceedingly unlikely. The handshake between the arbiter element and the queue protects the arbiter element from premature requests from the queue.

Figure 3:
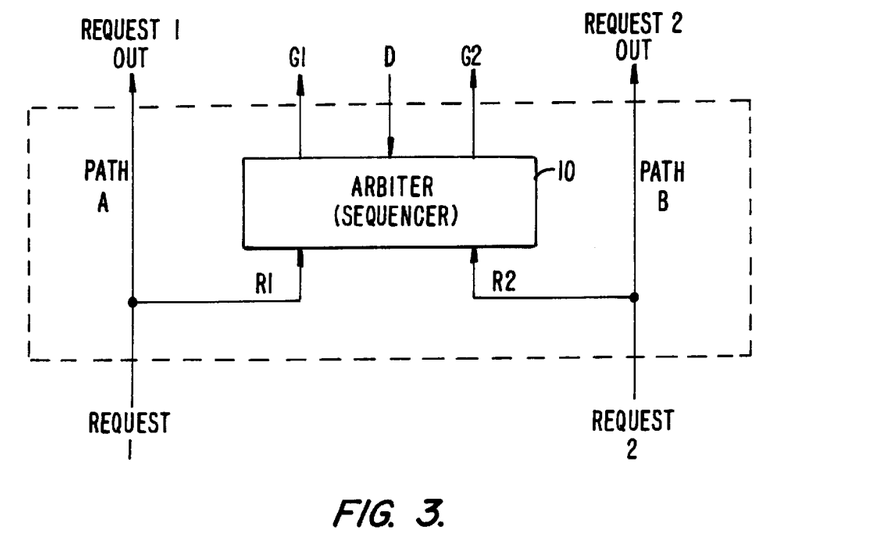
FIG. 3 is a block diagram of one embodiment of a Sequencer arbiter used in observing mode.

A conventional Sequencer arbiter can be used in "observing mode," as shown in FIG. 3. In FIG. 3 an arbiter element 10, in this case a Sequencer arbiter, is connected to receive requests R1 and R2 from path A and path B. In response it orders the requests by issuing grant signals G1 and G2 reflecting the approximate temporal order of the arrival of the requests arriving on path A and path B. The done input terminal D of the arbiter is used to indicate receipt of the G1 or G2 signal by the external circuitry (not shown) to which the grant signals are supplied. This degenerate form of an Observer, without input queues, does not offer the additional flexibility that the Observer provides. However, this form does have utility in special applications where no more than one request per input is permitted.

An example of the use of arbiters employed in observing mode is in the on-chip delay measuring technique described in U.S. patent application No. 08/841,651, filed Apr. 30, 1997, and entitled "Measurement of Signal Propagation Delay Using Arbiters." In this application, two arbiters serve as "time amplifiers," with a first arbiter used in observing mode comparing the arrival times of the starting events supplied to the inputs of two test circuits. A second arbiter used in observing mode compares the times of events indicating completion of the two circuits at their outputs. Variable delays external to the chip adjust the arrival times of starting signals to the two circuits. An initial adjustment of the external delays sets the two starting times to match exactly, as indicated by the first arbiter. Thus, the first arbiter gives a sensitive indication of which starting signal arrives first, making it possible to adjust the external delays for an essentially exact match of starting times. A subsequent adjustment of the external delays makes a similar match in the completion times of the two on-chip circuits as reported by the second arbiter. The difference in the initial and subsequent adjustments of the external delays indicates the difference in the delays of the two on-chip circuits. Of course, one of the on-chip circuits could have zero delay making it possible to measure accurately the delay of any on-chip circuit.

Figure 4:
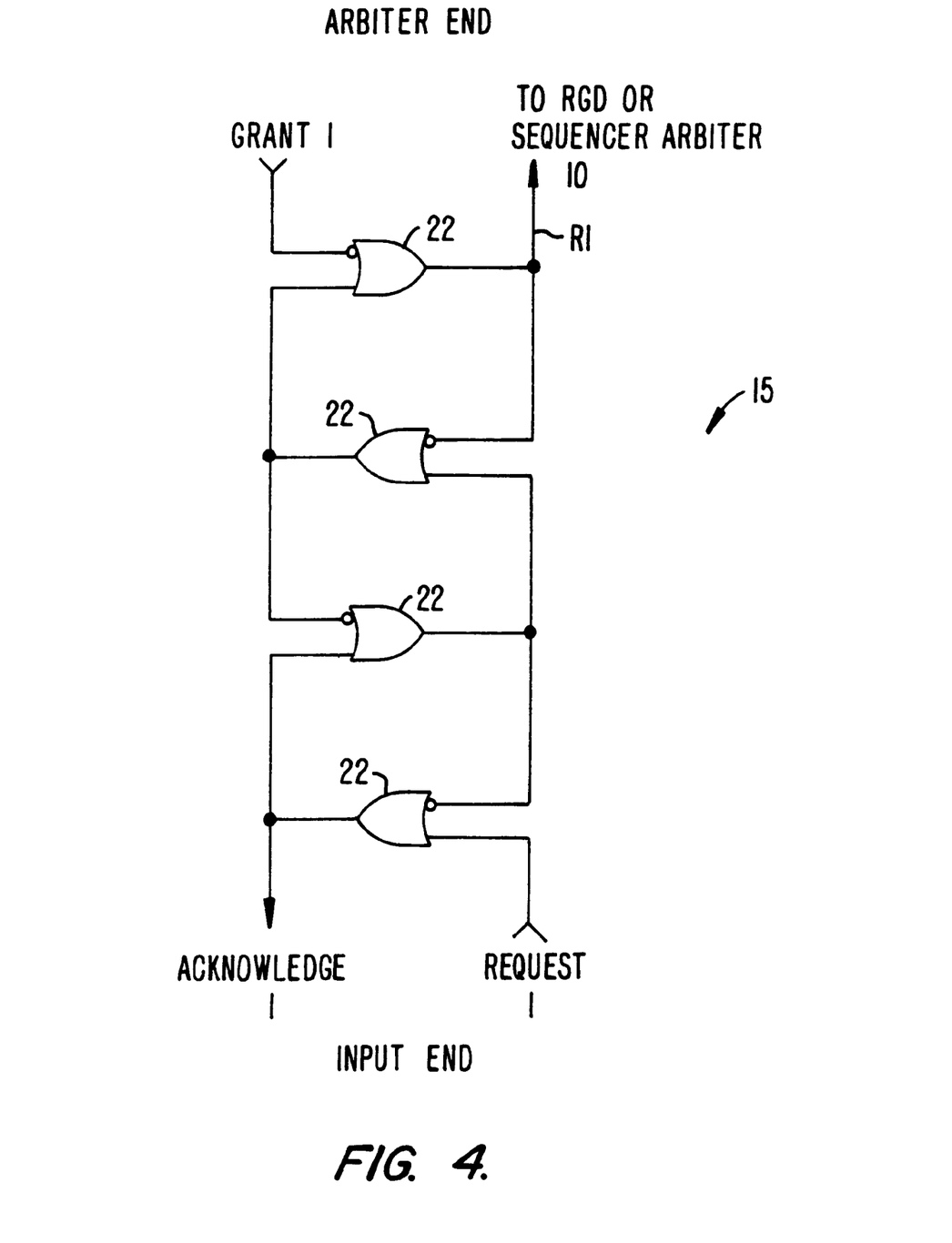
FIG. 4 illustrates in more detail one embodiment of the request queues of the Observing arbiter of FIG. 2.

FIG. 4 illustrates one embodiment of either of the queues 12, 15. As shown, a series of Muller C-elements 22, individually well known in the art, is employed. The simplicity of this input form minimizes delay and costs. The chain of Muller C-elements provides signal pathways for the acknowledge, request and grant signals.

The queues, one of which is depicted in FIG. 4, permit accumulation of multiple requests generated by paths A and B, the number governed by the depths of the queues. In the figure a four-stage queue is illustrated. If the minimum interval between consecutive requests presented to each queue input is longer than the time needed for the queue to capture an input event, then the system can operate safely without requiring an acknowledge from the queues to the sources of events A and B, provided that the queue is not filled when an input event arrives. Thus, the problem of premature requests is moved from the arbiter input terminal to the queue input terminal.

Figure 5:
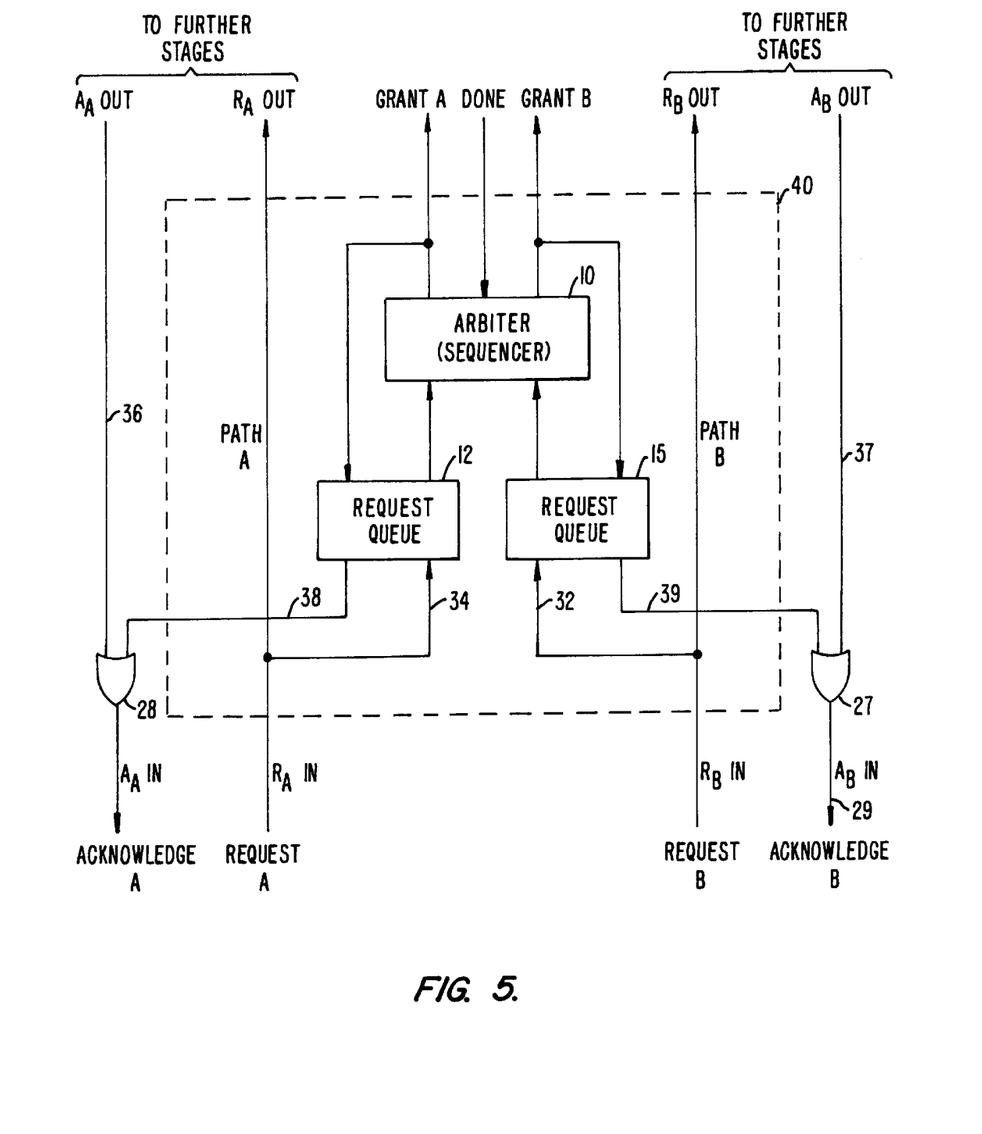
FIG. 5 illustrates one embodiment of an Observing arbiter with acknowledge feedback signals.

For any continuing stream of input signals, there is some length of delay of the arbitration decision that will cause the queue to fill and overflow. Input queues can reduce the probability of such a failure, but cannot make it zero. The accuracy with which the sequence defined by the arbiter reproduces the temporal ordering of input events appears to be reduced by the presence of the queues. Thus, in some embodiments, it is desirable to provide feedback from the arbiter to the sources of the requesting events. FIG. 5 illustrates such an Observing arbiter 40.

As shown in FIG. 5, a Sequencer arbiter element 10 is connected to receive input events from queues 12, 15 and to provide grant signals just as in FIG. 2. As before, an RGD arbiter element could also be used. In addition, however, Muller C-elements 27 and 28 are provided to assure that the request queues operate properly. Muller C-element 28, for example, provides an acknowledge event on signal path 30 only when two events happen. First, the next stage of path A (not shown) above the stage depicted in FIG. 5 must accept a request and acknowledge it on signal path 36. Second, the request queue 12 must acknowledge via signal path 38 the request it previously received on signal path 34. Because the request queue 12 will not provide the acknowledge event until it has space to store the previously received request, the mechanism described assures that events will not be accepted by subsequent stages out of order.

The combination of the input queues 12, 15 and the acknowledge signals 29, 30 to the source of the request events may reduce the effect of conventional arbitration time on the flow of the events that are being ordered as compared to arbitration schemes that do not employ such queues. Thus, as shown in FIG. 5, we provide a pair of queues 12, 15 ahead of the arbiter element 10. As before, queue inputs 32, 34 are driven respectively by the passage of events along paths A and B. Also as before, the request events are permitted to continue their flow regardless of the acknowledgements of their requests by the queues. The acknowledge signals 38, 39 from the queues combined in C-elements 28, 27 with the acknowledge signals 36, 37 from the further stages respectively provide acknowledge signals 30, 29 that give the source of events Request A and Request B permission to present a next event.

A properly designed queue 12, 15 will acknowledge a request within a short fixed time, provided that it is not full when presented an event. The resulting minimum time between input requests to the queue is set by the time needed by the queue to respond to an input and generate an acknowledge, plus the time needed by the event source to accept that acknowledge and generate a next event. Only when the queue is full will this time be lengthened. Upon finding a full queue, the event source must wait for a delayed acknowledge from the queue. Generally speaking, the queue will tend to fill when the average rate of arriving events exceeds the average rate at which the arbiter can accept input events, or when the arbiter occasionally requires much more than the typical time to make a decision. The minimum interval between successive events that can be accepted by a non-full queue should be significantly shorter than the minimum interval needed between successive inputs to the arbiter element 10 itself.

Single isolated events on paths A and B will both pass, with neither path suffering delay as a result of their interaction. However, the arbiter will necessarily issue the corresponding two grants sequentially, so that the issuance of a grant to one request may be delayed by the presence of the other request. When both paths A and B carry a substantial rate of event flow, we expect mutual interference in these event flows to appear when the total rate of A plus B approaches the rate at which the arbiter can typically process requests and issue grants. At such input rates, the input queues begin to fill. Although usually queues 12 and 15 will be of equal length, it can be advantageous to employ different lengths—tuning the two lengths to the average rate of arriving events of the two input streams, when these rates differ.

As discussed, there is no absolute temporal ordering that could be measured perfectly by even an ideal arbiter, and practical difficulties further degrade the ability of a physical arbiter to make repeatable and consistent measurements of its input events. This is a consequence of unavoidable noise and bias in the internal arbitration mechanism. When two contending input events are close enough together, even on repeated trials with exactly the same timing of inputs, the arbiter will sometimes grant to one and sometimes the other, in an unpredictable fashion. The use of input queues 12, 15 further weakens the connection between arbiter ordering and the assumed temporal ordering of the signals in path A and path B.

As mentioned above, however, if events flowing independently are regarded as mutually unordered until they are assigned an order by an arbiter, the problem of imprecise relationship of assigned order to assumed temporal order is avoided. Difficulties arise in this approach if one asks about the consistency of orderings that are assigned by two arbiters observing the same or related events. In the conventional view, any inconsistencies of the two observations are attributed to the imperfections in each of the two order-measuring operations.

Figure 6:
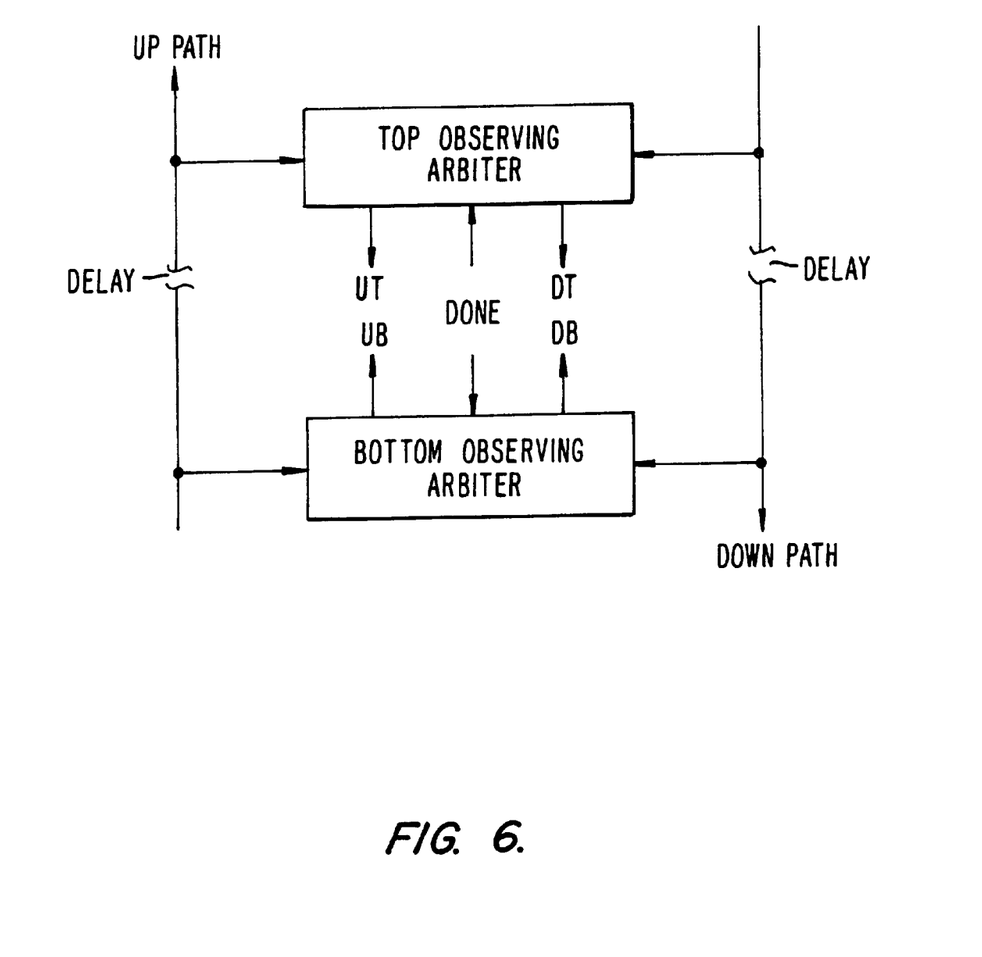
FIG. 6 illustrates one embodiment of Observing arbiters in a counterflow pipeline system.

A more realistic situation involves consistency in ordering related events. This problem has already been noted in the counterflow pipeline design (see "Counterflow Pipeline Processor Architecture," by R. F. Sproull, I. E. Sutherland, and C. E. Molnar, Sun Microsystems Laboratories, Inc., Publication No. T-94-25, April 1994) where decisions about the state of a stage require ordering decisions from two arbiters, at the bottom and top boundaries of the stage. This circumstance is illustrated in FIG. 6. The events at the two boundaries are related because upward-flowing signals flow past the bottom boundary of a stage and then past the top boundary, while downward-flowing signals flow in the opposite direction. Typically, there will be various other elements between the two stage boundaries. These are not illustrated in FIG. 6, but these other elements will introduce a time delay, represented by the interruptions in the up and down paths. We expect that the crossing UB of the bottom boundary that an upward signal meets should be ordered ahead of the crossing UT of the top boundary, and similarly that DT should precede DB.

The top arbiter orders events UT and DT, and the bottom arbiter orders events UB and DB. If we view the arbiters as defining the orderings of these pairs of events, rather than measuring them, there is no reason to restrict the order that each can assign to the two events that it observes. We can imagine that it might result in the temporal ordering (UB, DT, UT, DB), for example, or perhaps (DT, UB, UT, DB), or even some other temporal order. Thus, the Observing arbiter described above is particularly suitable for application to counterflow pipeline processors.

The Observing arbiter presented here has significant speed advantages over the prior art when an ordering of events is required—subsequent input events are usually not delayed waiting for the arbiter to decide and produce a Grant to the first Request event. The arbitration decisions are carried out concurrently with the propagation of the input requests to further stages, as shown in FIGS. 2 and 5, where these requests can initiate further actions or processing independent of the outcome of the arbitration decision. Furthermore, the actions initiated by the Observing arbiter's grant outputs can also be carried out concurrently with the further propagation of these input requests.

The foregoing has been a description of embodiments of the invention. It will be appreciated that numerous departures from the specific circuitry shown may be made without departing from the spirit of the invention, which is further defined in the appended claims and their equivalents.

What is claimed is:

1. A system for determining a sequence of signals representative of events comprising:
   at least a first input connection and a second input connection for carrying the signals representative of events; and
   an arbiter coupled to the first input connection and to the second input connection to receive signals representative of events from each of the input connections, the arbiter determining a temporal order of occurrence of the representations of events when such events arrive at time intervals greater than a specified amount, and arbitrarily assigning a sequence to one or the other of the events when such events arrive at time intervals equal to or less than the specified amount, the arbiter reporting one of the temporal order or arbitrary sequence as a sequence of output signals.

2. The system of claim 1 wherein the arbiter comprises a request—grant—done arbiter.

3. The system of claim 1 wherein the arbiter comprises a Sequencer arbiter.

4. The system of claim 1 further comprising:
   a first input queue coupled between the first input connection and the arbiter, the first input queue for storing representations of events that are waiting to be processed; and
   a second input queue coupled between the second input connection and the arbiter, the second input queue for storing representations of events that are waiting to be processed.

5. The system of claim 4 wherein each of the first input queue and the second input queue comprise first in first out storage.

6. The system of claim 5 wherein each of the first input queue and the second input queue comprise a series of Muller C-elements.

7. The system of claim 4 wherein the arbiter provides a separate grant signal as an output signal to designate one of the temporal order or arbitrary sequence for each of the first input connection and the second input connection.

8. The system of claim 7 wherein the separate grant signal for each of the first input connection and the second input connection is also coupled to be received by the corresponding one of the first input queue and the second input queue.

9. A system for determining a sequence of signals representative of events occurring variously on input connections, the system comprising:
   at least a first input connection and a second input connection for carrying the signals representative of events;
   a first input queue coupled to the first input connection, the first input queue for storing representations of events that are waiting to be processed and in response to the receipt thereof providing acknowledgement signals;
   a second input queue coupled to the second input connection, the second input queue for storing representations of events that are waiting to be processed and in response to the receipt thereof providing acknowledgement signals; and
   an arbiter coupled to the first input queue and to the second input queue to receive representations of events from each of the queues, the arbiter determining a temporal order of occurrence of the event representations in the queues when such events arrive at time intervals greater than a specified amount, and arbitrarily assigning a sequence to one or the other of the events from the queues when such events arrive at time intervals equal to or less than the specified amount, the arbiter reporting one of the temporal order or arbitrary sequence as a sequence of grant signals.

10. The system of claim 9 wherein the arbiter removes each event representation from the appropriate queue when reporting its temporal order or sequence.

11. The system of claim 10 wherein the arbiter, in response to receipt of each of the representations of events, provides acknowledgement signals.

12. A system for determining a sequence of signals representative of events comprising:
   at least a first input connection and a second input connection for carrying the signals representative of events; and
   an arbiter coupled to the first input connection and to the second input connection to receive signals representative of events from each of the input connections, without providing feedback thereto, the arbiter determining a temporal order of occurrence of the representations of events when such events arrive at time intervals greater than a specified amount, and arbitrarily assigning a sequence to one or the other of the events when such events arrive at time intervals equal to or less than the specified amount, the arbiter reporting one of the temporal order or arbitrary sequence as a sequence of output signal.

13. The system of claim 12 further comprising:
   a first input queue of first fixed length coupled to the first input connection, the first input queue for storing representations of events that are waiting to be processed; and a second input queue also of second fixed length coupled to the second input connection, the second input queue for storing representations of events that are waiting to be processed.

14. The system of claim 13 wherein the first and the second length are the same length.

15. The system of claim 14 wherein each of the first input queue and the second input queue comprise Muller C-elements.

16. A method for processing requests made to an arbiter having a plurality of input channels, the method comprising:

supplying signals representative of requests to the input channels;

for requests arriving at time intervals greater than a specified amount, determining a temporal order of occurrence of the requests;

for requests arriving at time intervals other than greater than the specified amount, assigning arbitrarily a sequence to the events; and reporting the temporal order or arbitrary sequence as a sequence of output signals.

17. A method for processing requests made to an arbiter having a plurality of input channels the method comprising:

supplying signals representative of requests to the input channels; and reporting the temporal order of the requests as a series of output signals unless the requests arrive faster than the arbiter can so report, and if so, then reporting the requests in an arbitrary sequence.

* * * * *